Dec. 20, 1960      G. M. KRAMER      2,965,693
PARAFFIN ALKYLATION WITH SURFACE ACTIVE AGENTS
Filed Dec. 31, 1958
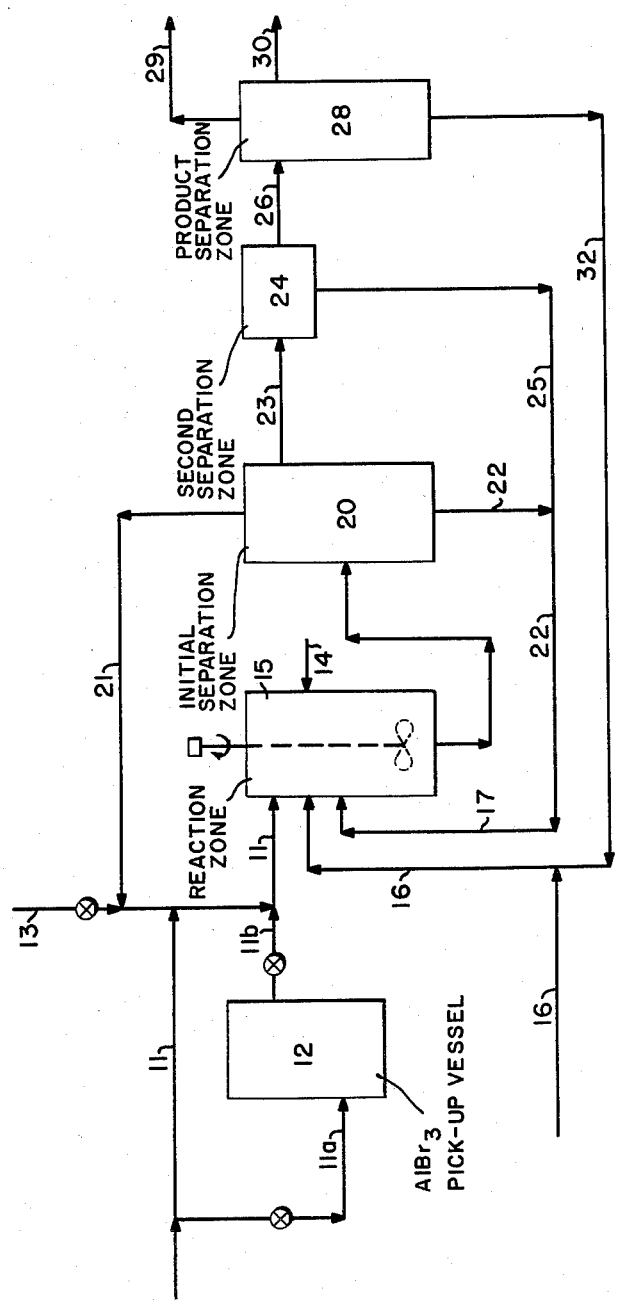
George M. Kramer     Inventor
By [signature] Attorney

United States Patent Office 2,965,693
Patented Dec. 20, 1960

2,965,693

PARAFFIN ALKYLATION WITH SURFACE ACTIVE AGENTS

George M. Kramer, Plainfield, N.J., assignor to Esso Research and Engineering Company, a corporation of Delaware Filed Dec. 31, 1958, Ser. No. 784,122

9 Claims. (Cl. 260—683.53)

This invention is concerned with the preparation of desirable branched chain paraffin hydrocarbons boiling in the motor fuel range by a process that involves reaction of a butane or a pentane, preferably isobutane, with paraffin hydrocarbons of from 6 to 18 carbon atoms. The process employs a promoted catalyst comprising aluminum bromide and involves simultaneous isomerization, cracking and alkylation reactions. The reaction is conveniently referred to as a paraffin alkylation reaction. In accordance with the present invention, the activity of aluminum bromide in this reaction is promoted by certain surface active agents in conjunction with alkyl halides.

Petroleum refiners are continuously faced with the problem of supplying greater quantities of high octane rating motor fuels to meet the requirements of modern high compression internal combustion engines employed in the automotive industry. Heretofore, the supply of high octane rating gasoline components has been augmented principally by polymerization and alkylation processes using $C_3$ and $C_4$ petroleum fractions as starting materials. These processes have a number of disadvantages in that they require several separate operations and necessitate the use of olefin hydrocarbons, which are usually in relatively limited supply.

It has now been found that butanes and pentanes can be caused to react directly with higher paraffin hydrocarbons to give good yields of $C_5$ to $C_7$ saturated branched chain hydrocarbons of high octane rating by employing a catalyst that comprises a three-component complex of aluminum bromide with a surface active agent and an alkyl halide of from 2 to 8 carbon atoms. This catalyst complex is much more reactive than catalysts that have previously been proposed for reactions of this type.

Among the surface active agents that may be employed in practicing the present invention are included metal soaps, such as calcium stearate, zinc stearate and metal salts of alkyl sulfonic acids, as well as other surface active agents of the cationic or anionic type, such as alkyl sulfonic acids and various quaternary ammonium compounds. Non-ionic detergents, such as long chain polyethers, may also be employed. The surface active agents used should not form a substantial precipitate or an additional phase with the alkyl halide and aluminum bromide. Those that do, such as sodium octyl sulfate, do not give satisfactory activity for the reaction. In other words, the surface active agent, the alkyl halide and the aluminum bromide should form a substantially homogeneous phase.

The catalyst complexes of the present invention are prepared by using proportions in the range of 0.01 to 0.1 mole of surface active agent per mole of aluminum bromide and 0.1 to 1 mole of alkyl halide per mole of aluminum bromide.

The process will be described with particular reference to the use of isobutane as the lighter component. Referring now to the drawing in detail, isobutane from a suitable source is conducted by means of line 11 into a stirred reaction zone 15 containing a liquid catalyst complex comprising aluminum bromide in admixture with a surface active agent and an alkyl halide. A portion of the isobutane stream may be diverted by means of lines 11a and 11b through an aluminum bromide pickup vessel 12 for the purpose of replacing aluminum bromide that may be lost from the system by solution in the product stream.

A stream of a higher paraffin hydrocarbon, as for example, heptane, octane or cetane, or of mixtures containing the higher paraffins, is conducted into the reaction zone by means of line 16. Hydrogen halide promoter, e.g., HBr, may be added through line 13. If HBr is used, it may be present in proportions of about 0.3 to 8.0 wt. percent based on the hydrocarbon.

The reaction product leaves the reaction zone through line 17 and is conducted into an initial separation zone 20 wherein separation of the liquid catalyst from the reaction product takes place. The settled catalyst layer may be recycled to the reaction zone by means of line 22. Light materials including unreacted isobutane and n-butane are removed overhead by means of line 21 and recycled to the reaction zone. The remainder of the reaction products may then be conducted by means of line 23 into a second separation zone 24, if necessary, for further separation of liquid catalyst from the hydrocarbons. Zone 24 may comprise a centrifuge, for example. Separated catalyst is added to that in line 22 by means of line 25. The essentially catalyst-free product is sent via line 26 to a product separation zone 28, wherein various fractions including $C_5$ to $C_7$ hydrocarbons may be removed overhead or as side streams through lines 29 and 30. Heavier product materials comprising $C_8$ hydrocarbons and higher may be recycled if desired by means of line 32.

In place of isobutane, the feed in line 11 may comprise normal butane, in which case no higher hydrocarbon feed will be sent initially to the reaction zone but the butane will be recycled through line 17, zone 20 and line 21 until a considerable amount of the butane has been isomerized to isobutane.

Reaction temperatures are relatively low and range from about 30 to about 140° F. At temperatures above about 140° F. considerable cracking occurs and the principal products are propane and lighter materials. The preferred temperature range is from about 50° F. to about 120° F. Feed rates may vary from about 0.5 to about 5 w./hr./w. (weight of total hydrocarbon per hour per weight of $AlBr_3$ in the complex), while rates of from about 1 to 3 w./hr./w. are preferred. Pressures are sufficient to keep the reacting hydrocarbons in the liquid phase.

As a minimum it is preferred that the mole ratio of isobutane to higher paraffin be at least 3:1. If sufficient iso-$C_4$ is not present in the reaction zone to effect alkylation of the materials obtained when a higher paraffin or other higher product of the reaction is cracked by the catalyst, catalyst sludging will result. Mole ratios as high as 10 to 1 may be employed. The feed stock must be essentially free of aromatic hydrocarbons and not more than about 0.02% of such material should be present, if catalyst deactivation is to be avoided. Naphthene hydrocarbons may be tolerated in the feed stock up to about 20 volume percent. With increased naphthene content the reaction temperature for equivalent activity must be increased somewhat as compared to a reaction in the absence of naphthenes.

To remove aromatics from the feed stock conventional techniques may be employed such as solvent extraction, hydrogenation, acid treating and the like, as well as treatment with selective adsorbents such as molecular sieve zeolites. It is not necessary that the higher hydrocarbons used be individual hydrocarbons such as heptane or octane or cetane, for example, but mixtures may be used, such as a petroleum fraction containing paraffinic hydrocarbons in the range of 6 to 18 carbon atoms.

The following examples are illustrative of the invention.

EXAMPLE 1

Comparative tests were made with aluminum bromide alone and with various catalyst complexes to effect the reaction of 80 volume percent of isobutane (87.4 grams), 19 volume percent of normal heptane (27.4 grams) and 1 volume percent of methylcyclohexane (1.7 grams). In each case a reaction temperature of 72° to 75° F. and a reaction period of three hours were used. The mixed hydrocarbon feed was added directly to the premixed catalyst complex in an agitated reactor and the products were analyzed at the end of the 3-hour reaction period. The results of the various tests are presented in Table I.

It will be noted that aluminum bromide alone had essentially no activity for the desired reaction. Zinc stearate in conjunction with aluminum bromide promoted the reaction to only a minor degree while the 3-component complex comprising zinc stearate, aluminum bromide and n-butyl bromide exhibited considerable paraffin alkylation activity.

The greatest activity, as measured by the net conversion of heptane to $C_5$ and $C_6$ branched chain paraffins, was with 0.015 to 0.03 mole of zinc stearate and 0.25 to 0.4 mole of butyl bromide per mole of $AlBr_3$. In a similar test using the same feed with 23.6 grams of $AlBr_3$, 3 grams of zinc stearate and 2 grams of n-heptyl bromide (0.125 mole alkyl halide per mole $AlBr_3$), the product yield was 32.3% i-$C_5$, 5.1% n-$C_5$, 19.7% i-$C_6$, 1.1% n-$C_6$, 33.4% i-$C_7$, 6.4% n-$C_7$ and 1.9% $C_8$+ paraffin hydrocarbons.

EXAMPLE 2

In other tests conducted in the same manner as those in Example 1, tetramethyl ammonium bromide, trimethyl cetyl ammonium bromide and ethyl sulfonic acid were also evaluated in conjunction with butyl bromide as catalysts for the paraffin alkylation reaction. In each case the mole ratio of butyl bromide to $AlBr_3$ was 0.25 and the mole ratio of surface active agent to $AlBr_3$ was 0.03. The ethyl sulfonic acid contained small proportions of methyl and propyl sulfonic acids and was obtained under the trade name Indoil. The results of the additional tests, presented in Table II, show that each of the complexes was quite active in converting n-heptane into $C_5$ and $C_6$ paraffin isomers.

Table II

| Surface Active Agent Used | None | Tetramethyl Ammonium Bromide | Trimethyl Cetyl Ammonium Bromide | Ethyl Sulfonic Acid |
|---|---|---|---|---|
| Catalyst, g.: | | | | |
| $AlBr_3$ | 23.6 | 23.6 | 23.6 | 23.6 |
| n-Butyl Bromide | 3.0 | 3.0 | 3.0 | 3.0 |
| Surface Active Agent | ---- | 0.41 | 0.96 | 0.3 |
| Analysis of $C_5$+ Product, Wt. percent: | | | | |
| iso-$C_5$ | 22.2 | 36.1 | 40.5 | 37.5 |
| n-$C_5$ | 1.8 | 4.7 | 6.6 | 5.1 |
| Total $C_5$ | 24.0 | 40.8 | 47.1 | 42.6 |
| iso-$C_6$ | 9.0 | 19.2 | 20.5 | 21.0 |
| n-$C_6$ | 0.5 | 0.9 | 1.3 | 1.1 |
| Total $C_6$ | 9.5 | 20.1 | 21.8 | 22.1 |
| iso-$C_7$ | 37.6 | 23.1 | 23.9 | 26.7 |
| n-$C_7$ | 28.1 | 14.1 | 4.6 | 7.8 |
| Total $C_7$ | 65.7 | 37.2 | 28.5 | 34.5 |
| Total $C_8$+ | 0.9 | 1.8 | 2.3 | 0.6 |

Table I

PARAFFIN ALKYLATION OF ISOBUTANE WITH n-HEPTANE

[Feed: 27.4 g. n-heptane; 87.4 g. isobutane; 1.7 g. methyl cyclohexane]

| | Test 1 | Test 2 | Test 3 | Test 4 | Test 5 | Test 6 | Test 7 | Test 8 |
|---|---|---|---|---|---|---|---|---|
| Catalyst, g.: | | | | | | | | |
| $AlBr_3$ | 23.6 | 23.6 | 23.6 | 23.6 | 23.6 | 23.6 | 23.6 | 23.6 |
| Zn Stearate | ---- | 1.0 | 2.0 | 2.0 | 1.0 | 0.5 | 0.5 | 3.0 |
| n-butyl bromide | ---- | ---- | ---- | 1.5 | 3.0 | 2.0 | 4.5 | 3.5 |
| Mole ration Zinc stearate/$AlBr_3$ | ---- | ~0.03 | 0.06 | 0.06 | 0.03 | 0.015 | 0.015 | 0.09 |
| Mole ratio Butyl Bromide/$AlBr_3$ | ---- | ---- | ---- | 0.125 | 0.25 | 0.17 | 0.38 | 0.31 |
| Analysis of $C_5$+Product, Wt. Percent: | | | | | | | | |
| iso-$C_5$ | 0.4 | 8.1 | 10.1 | 25.0 | 37.0 | 33.1 | 42.0 | 23.1 |
| n-$C_5$ | 0.3 | 1.1 | 1.5 | 3.8 | 5.1 | 4.8 | 5.0 | 4.7 |
| Total $C_5$ | 0.7 | 9.2 | 11.6 | 29.8 | 42.1 | 37.9 | 47.0 | 37.8 |
| iso-$C_6$ | 0.5 | 5.3 | 6.8 | 15.8 | 20.4 | 20.2 | 22.5 | 21.2 |
| n-$C_6$ | 0 | 0.2 | 0.2 | 0.9 | 1.1 | 1.0 | 1.3 | 1.7 |
| Total $C_6$ | 0.5 | 5.5 | 7.0 | 16.7 | 21.5 | 21.2 | 23.8 | 22.9 |
| iso-$C_7$ | 46.2 | 43.8 | 41.8 | 39.2 | 28.2 | 28.6 | 20.6 | 30.6 |
| n-$C_7$ | 52.6 | 40.8 | 39.1 | 12.8 | 6.2 | 9.8 | 5.9 | 8.9 |
| Total $C_7$ | 98.8 | 84.6 | 80.9 | 52.0 | 34.4 | 38.4 | 26.5 | 39.5 |
| Total $C_8$+ | 0 | 0.8 | 0.6 | 1.6 | 1.5 | 2.2 | 2.2 | 0 |

It will be understood that this invention is not to be limited by any theory regarding its operation nor by the specific examples herein presented by way of illustration of the invention. Numerous modifications within the spirit and scope of the invention will occur to those skilled in the art. The invention is defined by the appended claims.

What is claimed is:

1. A process for the preparation of high octane naphtha components consisting largely of branched chain paraffin hydrocarbons of from 5 to 7 carbon atoms which comprises reacting minor proportions of paraffin hydrocarbons of from 6 to 18 carbon atoms with major proportions of hydrocarbons selected from the group consisting of butanes and pentanes, at temperatures no higher than about 140° F., in the presence of a complex comprising aluminum bromide, an alkyl halide of from 2 to 8 carbon atoms, and a surface active material selected from the group consisting of alkyl sulfonic acids, metal salts of alkyl sulfonic acids, metal stearates, and quaternary alkyl ammonium halides, said surface active material forming an essentially homogeneous phase with the aluminum bromide and alkyl halide.

2. Process as defined by claim 1 wherein the mole ratio of alkyl halide to aluminum bromide in the complex is in the range of from about 0.1 to about 1.

3. Process as defined by claim 1 wherein the mole ratio of surface active material to aluminum bromide is in the range of from about 0.01 to about 0.1.

4. Process as defined by claim 1 wherein said surface active material comprises zinc stearate.

5. Process as defined by claim 3 wherein said alkyl halide is butyl bromide.

6. Process as defined by claim 1 wherein said alkyl halide is heptyl bromide.

7. Process as defined by claim 1 wherein said surface active material is a quaternary alkyl ammonium bromide.

8. Process as defined by claim 1 wherein said surface active material comprises trimethyl cetyl ammonium bromide.

9. Process as defined by claim 1 wherein said surface active material comprises ethyl sulfonic acid.

References Cited in the file of this patent

UNITED STATES PATENTS

| | | |
|---|---|---|
| 2,220,090 | Evering et al. | Nov. 5, 1940 |
| 2,349,458 | Owen et al. | May 23, 1944 |
| 2,370,144 | Burk | Feb. 27, 1945 |
| 2,375,637 | Ellis | May 8, 1945 |
| 2,880,255 | Davis et al. | Mar. 31, 1959 |